(12) United States Patent
Lee et al.

(10) Patent No.: US 12,224,842 B2
(45) Date of Patent: Feb. 11, 2025

(54) ELECTRONIC DEVICE FOR DETECTING DIRECTIONS OF NEIGHBORING DEVICES IN WIRELESS COMMUNICATION SYSTEM, AND OPERATION METHOD THEREOF

(71) Applicant: GCT Research, Inc., Seoul (KR)

(72) Inventors: Eal Wan Lee, Seoul (KR); Jeong Min Kim, Seoul (KR)

(73) Assignee: GCT Research, Inc., Seoul (KR)

( * ) Notice: Subject to any disclaimer, the term of this patent is extended or adjusted under 35 U.S.C. 154(b) by 146 days.

(21) Appl. No.: 17/858,020

(22) Filed: Jul. 5, 2022

(65) Prior Publication Data
US 2023/0008254 A1 Jan. 12, 2023

(30) Foreign Application Priority Data
Jul. 7, 2021 (KR) .......................... 10-2021-0088844

(51) Int. Cl.
*H04B 7/08* (2006.01)
*H04L 1/00* (2006.01)
*H04W 4/02* (2018.01)

(52) U.S. Cl.
CPC ......... *H04B 7/0834* (2013.01); *H04L 1/0061* (2013.01); *H04W 4/023* (2013.01)

(58) Field of Classification Search
CPC ... H04B 7/0834; H04B 7/0802; H04L 1/0061; H04W 4/023
USPC ...................................................... 455/456.1
See application file for complete search history.

(56) References Cited

U.S. PATENT DOCUMENTS

| | | | | |
|---|---|---|---|---|
| 2011/0019599 | A1* | 1/2011 | Wood .................... | H04L 1/1858 370/310 |
| 2022/0091218 | A1* | 3/2022 | Hintsala ............ | H04W 72/0446 |
| 2022/0149977 | A1* | 5/2022 | Piirilä ...................... | H04K 3/25 |
| 2022/0397635 | A1* | 12/2022 | Lehtimaki ................ | G01S 5/04 |
| 2022/0416445 | A1* | 12/2022 | Dickey ............... | H01Q 15/244 |

FOREIGN PATENT DOCUMENTS

| | | | | |
|---|---|---|---|---|
| CA | 2898097 | A1 * | 7/2014 | .......... H04B 7/2612 |
| JP | 201254725 | | 3/2012 | |
| JP | 2014139753 | | 7/2014 | |
| KR | 100971772 | | 7/2010 | |

* cited by examiner

Primary Examiner — Tanmay K Shah

(57) ABSTRACT

Provided are an electronic device and an operation method of the electronic device for finding a direction of a neighboring device effectively in a wireless communication system without additional hardware. According to the present disclosure, there is provided an electronic device for finding a direction of a neighboring device in a wireless communication system, the electronic device includes an antenna array including a first antenna and a second antenna for receiving a radio frequency (RF) signal, an antenna switch configured to switch antennas for receiving the RF signal among the plurality of antennas, and a controller. The controller is configured to control the antenna switch to receive the RF signal from the neighboring device through the first antenna, control the antenna switch to switch from the first antenna to the second antenna to receive the RF signal during a time interval in which an error detection code is detected, and detect the direction in which the neighboring device is located based on a result of decoding the error detection code.

12 Claims, 14 Drawing Sheets

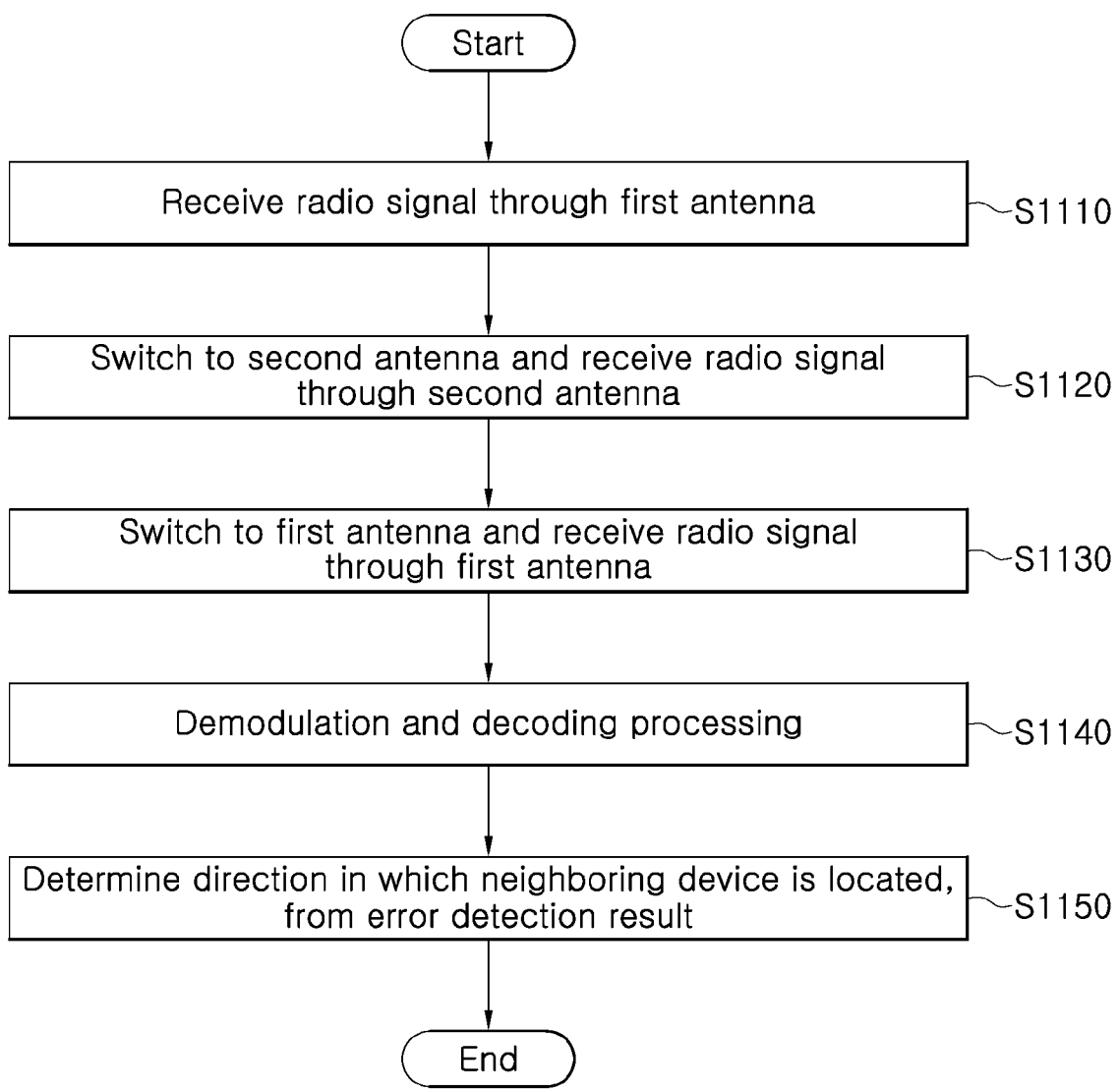

ELECTRONIC DEVICE FOR DETECTING DIRECTIONS OF NEIGHBORING DEVICES IN WIRELESS COMMUNICATION SYSTEM, AND OPERATION METHOD THEREOF

CROSS REFERENCE TO RELATED APPLICATION

The present application claims priority to Korean Patent Application No. 10-2021-0088844, filed Jul. 7, 2021, the entire contents of which is incorporated herein for all purposes by this reference.

BACKGROUND OF THE INVENTION

Field of the Invention

The present disclosure relates to an electronic device and an operation method of the electronic device for finding a direction of a neighboring device in a wireless communication system. More particularly, the present disclosure relates to a device and a method for finding a direction of neighboring devices by switching antennas during the transmission of a single packet and an error detection code for the packet.

Description of the Related Art

A wireless communication system is a system that enables data exchange between devices over wireless channels. For example, widely used are cellular communication, such as Long-Term Evolution (LTE) and 5G NR (New Radio), and short-range communication standards, such as Wi-Fi, Bluetooth, Zigbee, and Z-Wave.

Bluetooth communication, which is usually used for short-range communication between portable devices such as mobile phones, tablet PCs, earphones, etc., uses a frequency band ranging from 2.4 to 2.485 GHz. Since standard 5.1, there has been provided a direction finding function using two or more antennas.

In the meantime, direction finding may use a method of estimating a direction by using a phase difference between radio signals received from respective antennas. In general, for the extra device feature of direction finding on top of the data decoding, a method adding an extra hardware device dedicated only for direction finding into which hardware for data communication is implemented is adopted. However, the use of an additional hardware device results inevitably in an increase in costs and overall system complexity. Accordingly, there is a need for a method of finding a direction of a neighboring device by utilizing an existing configuration effectively as much as possible with minimal addition of extra complex hardware devices.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to providing an electronic device and an operation method of the electronic device for finding a direction of a neighboring device in a wireless communication system, the electronic device and the operation method being capable of finding a direction of a neighboring device effectively with minimal modification of the existing hardware for receiving data without additional hardware.

It is to be understood that technical problems to be solved by the present disclosure are not limited to the aforementioned technical problems and other technical problems which are not mentioned will be apparent from the following description to a person with an ordinary skill in the art to which the present disclosure pertains.

According to the present disclosure, there is provided an electronic device for finding a direction of a neighboring device in a wireless communication system, the electronic device includes an antenna array including a first antenna and a second antenna for receiving a radio frequency (RF) signal, an antenna switch configured to switch from the first antenna to the second antenna, and a controller. The controller is configured to control the antenna switch to receive the RF signal from the neighboring device through the first antenna, control the antenna switch to switch from the first antenna to the second antenna to receive the RF signal during a time interval in which an error detection code is detected, and detect the direction in which the neighboring device is located based on a result of decoding the error detection code.

According to an embodiment of the present disclosure, there is provided an operation method of an electronic device for finding a direction of a neighboring device in a wireless communication system, the electronic device including a plurality of antennas and the operation method includes receiving a radio frequency (RF) signal from the neighboring device through a first antenna of the plurality of the antennas, switching from the first antenna to a second antenna of the plurality of the antennas to receive the RF signal from the neighboring device through the second antenna during a time interval in which an error detection code is detected, and detecting the direction in which the neighboring device is located in a certain range based on a result of decoding the error detection code.

Effects that may be obtained from the present disclosure will not be limited to only the above-described effects. In addition, other effects which are not described herein will become apparent to those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which:

FIGS. 11 and 12 show flowcharts of a method of finding a direction of a neighboring device in a wireless communication system according to the present disclosure.

DETAILED DESCRIPTION OF THE INVENTION

Figure 1A:
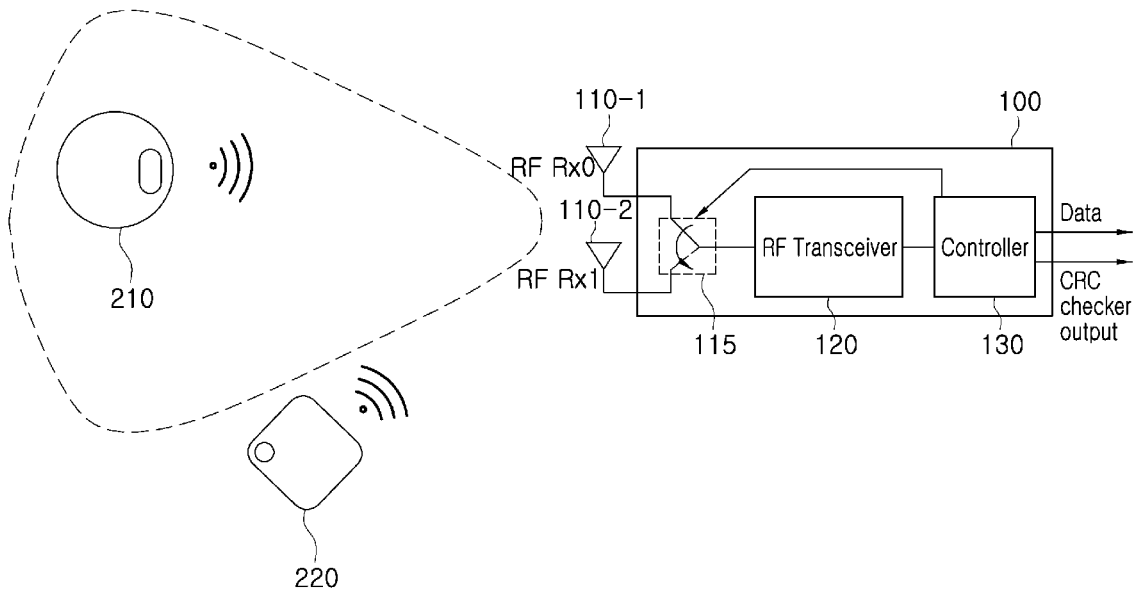
FIGS. 1A and 1B show a schematic component of a device for finding a direction of a neighboring device in a wireless communication system according to the present disclosure.

Hereinbelow, exemplary embodiments of the present disclosure will be described in detail with reference to the accompanying drawings such that the present disclosure can be easily embodied by those skilled in the art to which this present disclosure belongs. The present disclosure may be embodied in various different forms and should not be limited to the embodiments set forth herein.

In order to clearly describe the present disclosure, parts irrelevant to the description are omitted, and throughout the specification, the same reference numerals denote the same or similar elements.

In addition, in various embodiments, elements having the same configurations are denoted by the same reference numerals and will be described only in a representative embodiment. Only elements different from those of the representative embodiment will be described in the other embodiments.

Throughout the specification, when a part is referred to as being "connected (or coupled)" to another part, it includes not only being "directly connected (or coupled)", but also being "indirectly connected (or coupled)" with an interposing part therebetween. In addition, unless explicitly described to the contrary, the word "include" will be understood to imply the inclusion of stated elements but not the exclusion of any other elements.

Unless otherwise defined in the specification, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this application and the relevant art and will not be interpreted in an idealized or overly formal sense unless expressly so defined herein.

Figure 1B:
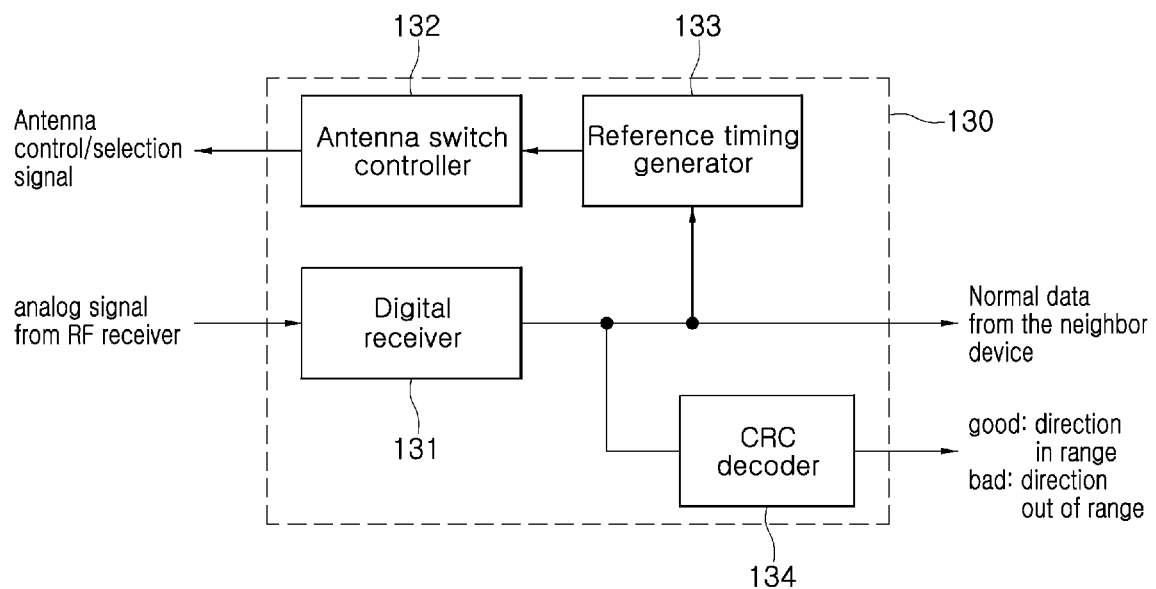

FIGS. 1A and 1B show a schematic component of an electronic device 100 for finding a direction of a neighboring device in a wireless communication system according to the present disclosure. Referring to FIG. 1A, there is provided an electronic device 100 performing direction finding according to the present disclosure. The electronic device 100 may communicate with neighboring devices 210 and 220 located nearby over wireless channels. For wireless communication, the electronic device 100 and the neighboring devices 210 and 220 exchange necessary information through initial connection. After the initial connection is finished, data transmission or reception may be performed.

In the meantime, recently, there has been discussed a method of finding a direction of a neighboring device 210 or 220 as in Bluetooth standard 5.1 and performing location tracking through direction finding, which expands the field of application. As a direction finding method, as shown in FIG. 1A, it is determined whether a neighboring device 210 or 220 is located in a particular direction with respect to the electronic device 100, thereby detecting the direction in which the neighboring device 210 or 220 is located.

Embodiments of the present disclosure provide a device and a method capable of finding a direction of a neighboring device 210 or 220 effectively by slightly modifying the existing system without additional hardware devices. According to the present disclosure, there is provided an electronic device 100 for finding a direction of a neighboring device in a wireless communication system, the electronic device 100 including an antenna array 110, an antenna switch 115, a radio frequency (RF) transceiver 120, and a controller 130. The antenna array 110 includes a first antenna 110-1 and a second antenna 110-2 that are spaced apart from each other by a predetermined distance. The antenna switch 115 selects antenna for receiving the RF signal among the plurality of antennas. The antenna switch 115 performs control to receive a RF signal from a neighboring device 210 or 220 through the first antenna 110-1, and performs control to switch from the first antenna 110-1 to the second antenna 110-2 and to receive the RF signal through the second antenna 110-2. The RF transceiver 120 demodulates the radio signal to generate a demodulation signal. The controller 130 controls the antenna switch 115 to switch a reception antenna in a section in which a tone signal is received. In addition, the controller 130 determines whether the demodulation signal is within a reference range through an error detection code (e.g., CRC) to detect the direction in which the neighboring device 210 or 220 is located.

The antenna array 110 includes a plurality of antennas. The antennas may be spaced apart from each other by a predetermined distance. According to an embodiment, the interval between the antennas may correspond to half of the wavelength of a radio signal. In this document, a case in which the antenna array 110 includes two antennas 110-1 and 110-2 is described as an example, but the number of antennas is not limited and may be defined variously according to implementation.

The antenna switch 115 may control the paths of radio signals transmitted from the antenna array 110 to the RF transceiver 120. For example, the antenna switch 115 may turn on the path from the first antenna 110-1 to the RF transceiver 120 and turn off the path from the second antenna 110-2 to the RF transceiver 120, and vice versa. The operation of the antenna switch 115 may be controlled by the controller 130. An antenna switch controller 132 of the controller 130 may control the antenna switch 115 with an antenna switch control signal. As the antenna switch control signal, a general purpose input/output (GPIO) signal may be used.

The RF transceiver 120 may perform signal processing on a radio signal received through the antenna array 110 to output a digital signal. The RF transceiver 120 may include elements, such as a filter, an amplifier, and a mixer, in addition to a demodulator that demodulates a modulated radio signal to output a digital signal. According to the present disclosure, a Gaussian minimum-shift keying (GMSK) method may be used as a modulation method. Hereinafter, an embodiment of the present disclosure will be described based on the GMSK modulation method. However, the scope of the present disclosure is not limited to the fields to which the GMSK modulation methods is applied. The present disclosure may be applied to all single-carrier modulation methods, and may be applied to multi-carrier modulation methods through slight change without great difficulty.

The controller 130 controls the overall operation of the electronic device 100, and may generate a control signal for controlling each module of the electronic device 100. In addition, the controller 130 may perform calculation necessary for the operation of the electronic device 100, and may include one or more processors. As shown in FIG. 1B, the controller 130 includes the antenna switch controller 132, reference timing generator 133, a digital receiver 131, and a CRC decoder 134. Here, the CRC decoder 134 works as a direction detector. The digital receiver 131 receives a demodulation signal (demodulation symbol) from the RF transceiver 120 and processes the demodulation signal. The antenna switch controller 132 performs control to receive a radio signal from a neighboring device 210 or 220 through the first antenna 110-1, and performs control to switch from the first antenna 110-1 to the second antenna 110-2 within a signal section in which an error detection code is able to be detected, and to receive the radio signal through the second antenna 110-2. The timing of the antenna switch control signal of the antenna switch controller 132 is generated with a programmable delay from the reference time generated by reference timing generator 133 detecting some pre-defined pattern in the payload. The CRC decoder 134 detects the direction in which the neighboring device is located based on a result of decoding the error detection code. The CRC decoder 134 may determine whether the neighboring device is located within a certain range of direction by determining whether a demodulation signal is within the reference range through a result of decoding the error detection code. The CRC decoder 134 may be configured as a decoder for processing digital signals output from the RF transceiver 120.

According to an embodiment of the present disclosure, the controller 130 may include a CRC decoder 134 that decodes cyclic redundancy check (CRC) code of the demodulation signal to determine whether data received from the neighboring device 210 or 220 is valid, that is, whether the data matches the original data. The controller 130 may decode CRC code included in a packet to check the validity of received data. In particular, according to the present disclosure, the direction of the neighboring device 210 or 220 may be detected by determining CRC code of a radio signal including a tone signal.

In the meantime, near the electronic device 100, a first neighboring device 210 and a second neighboring device 220 may be located. This document describes the case in which the first neighboring device 210 is located in an intended direction and the second neighboring device 220 is located in an unintended direction.

Figure 2:
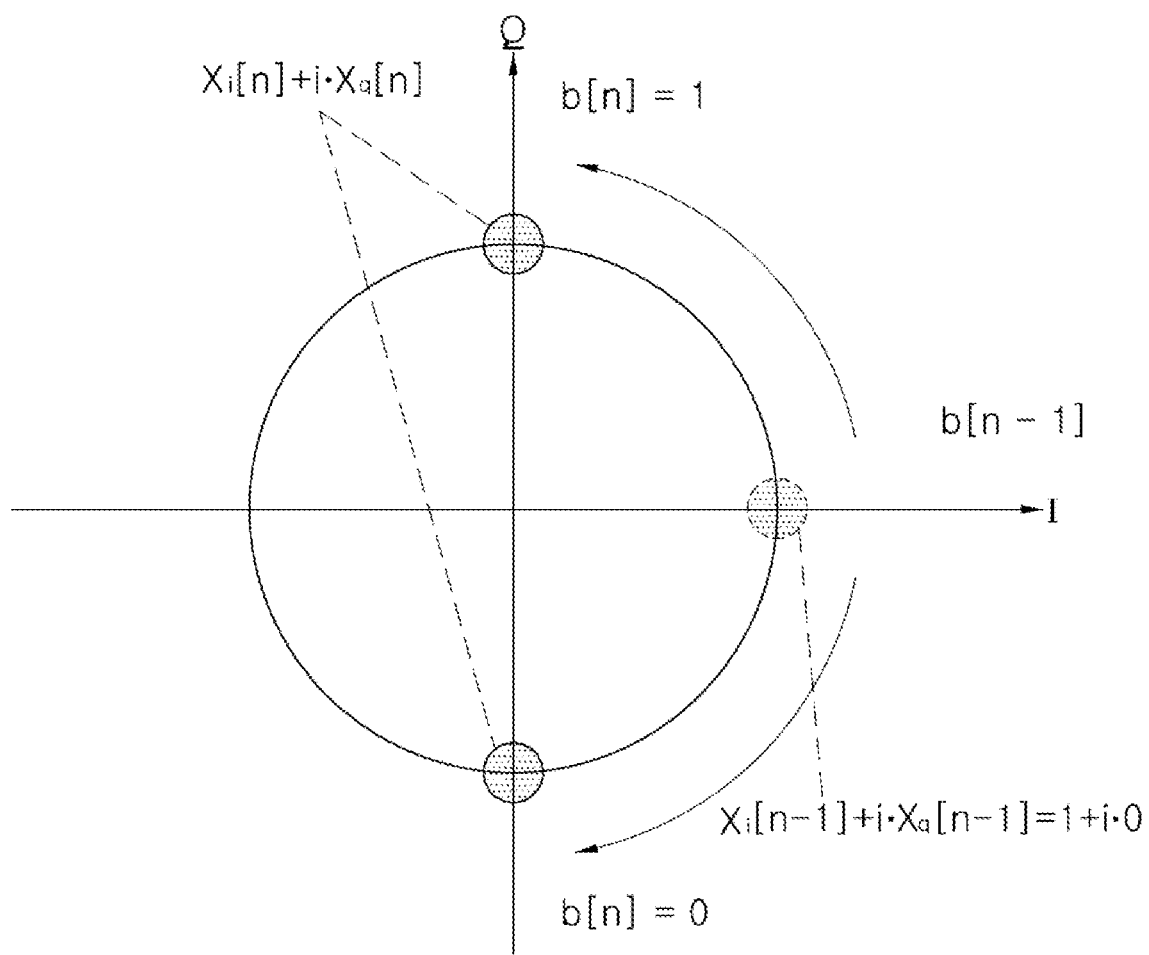
FIG. 2 shows a process of demodulating a radio signal to which Gaussian minimum-shift keying (GMSK) modulation is applied and mapping a resulting signal to a plane of a constellation diagram.

FIG. 2 shows a process of demodulating a radio signal to which Gaussian minimum-shift keying (GMSK) modulation is applied and mapping a resulting signal to a plane of a constellation diagram.

The GMSK is one of frequency-shift keying methods, and applies a Gaussian filter to a data stream to smooth a phase change, and then performs modulation, so that the bandwidth of a modulated signal may be reduced. FIG. 2 shows a constellation diagram for a case in which a modulation index (m) of a transmitter is 0.5 in a GMSK modulation method. In FIG. 2, the horizontal axis refers to an in-phase component, and the vertical axis refers to a quadrature component. As shown in FIG. 2, the symbol phase-shifted by $+\pi/2$ is mapped to bit "1", and the symbol phase-shifted by $-\pi/2$ is mapped to bit "0".

Although the present disclosure is described with the GMSK modulation method as an example, the present disclosure may be applied to various modulation methods as well as GMSK.

Figure 3:
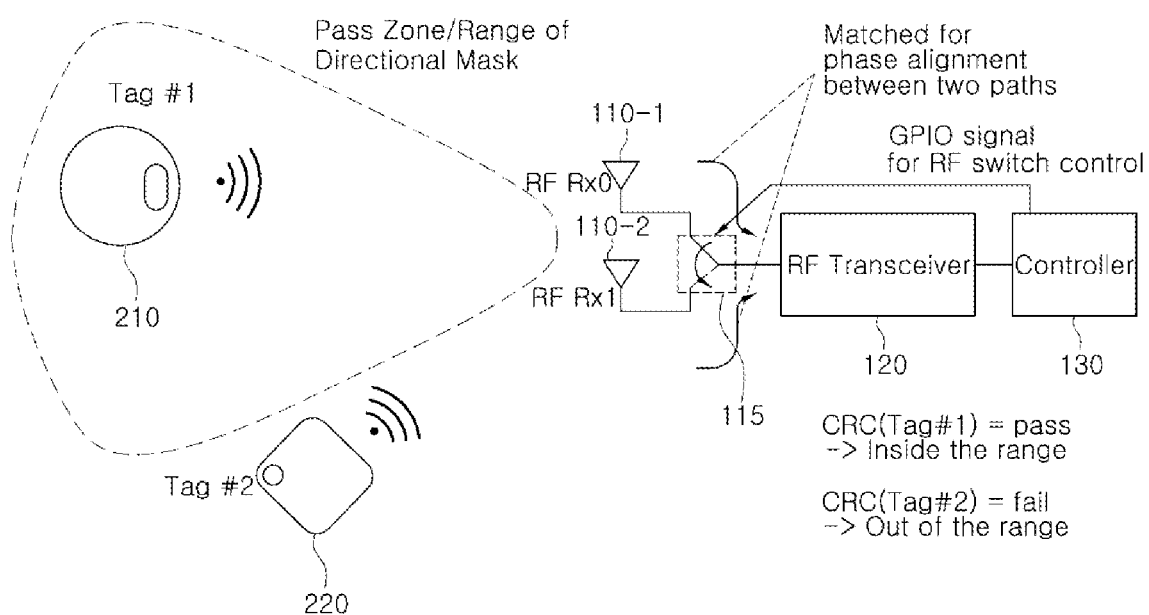
FIG. 3 shows a process of performing direction finding of a neighboring device through antenna switching and an error detection code.

FIG. 3 shows a process of performing direction finding of a neighboring device through antenna switching and an error detection code.

FIG. 3 shows a case in which the first neighboring device 210 (Tag #1) is located in a particular area (Pass Zone/Range of Direction Mask) in an intended direction, and the second neighboring device 220 (Tag #2) is located in an area excluding the particular area. According to the present disclosure, a radio signal received from the first neighboring device 210 is demodulated and read. As a result of checking the error detection code (e.g., CRC code), when an error is not detected (pass), it is determined that the first neighboring device 210 is located in the intended direction. Conversely, when a radio signal received from the second neighboring device 220 is demodulated and read. As a result of checking the CRC code, when an error is detected (fail), it is determined that the second neighboring device 220 is not located in the intended direction. Hereinafter, a direction finding method according to the present disclosure will be described in more detail.

Figure 4:
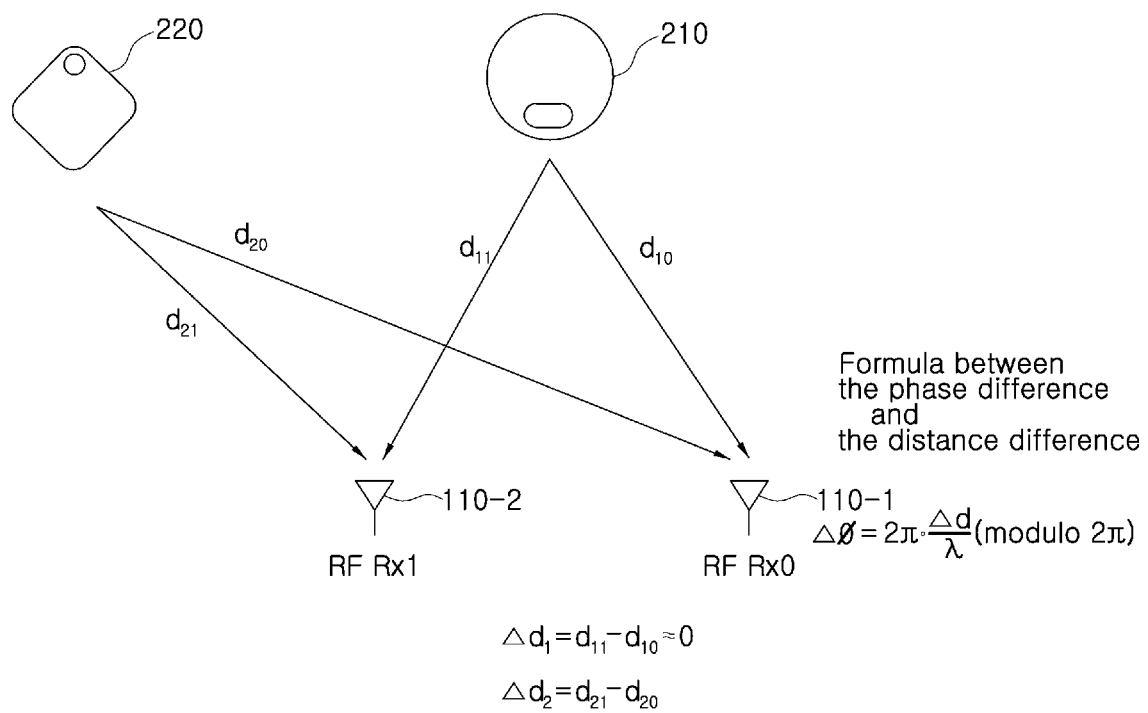
FIG. 4 shows a process in which a signal phase difference between antennas occurs according to a signal reception angle.

FIG. 4 shows a process in which a signal phase difference between antennas occurs.

Referring to FIG. 4, the first antenna 110-1 (RF Rx0) and the second antenna 110-2 (RF Rx1) are arranged with a predetermined interval therebetween, and receive radio signals from each of the first neighboring device 210 and the second neighboring device 220. In an embodiment, the radio signals may be signals modulated by GMSK. Herein, the phase difference between the radio signals received by the first antenna 110-1 and the second antenna 110-2 may be expressed as in Equation 1 below.

$$\Delta\phi = 2\pi \cdot \frac{\Delta d}{\lambda} \text{ (modulo } 2\pi) \qquad \text{[Equation 1]}$$

In Equation 1, $\Delta\phi$ denotes a phase difference between signals, $\lambda$ denotes a wavelength of a signal, and $\Delta d$ denotes the difference in distance between the neighboring device and each antenna.

The difference in distance between the first neighboring device 210 and each antenna is as shown in Equation 2 below, and substantially corresponds to 0.

$$\Delta d_1 = d_{11} - d_{10} \approx 0 \qquad \text{[Equation 2]}$$

In FIG. 4 the distance between the first neighboring device 210 and the first antenna 110-1 is denoted by $d_{10}$, and the distance between the first neighboring device 210 and the second antenna 110-2 is denoted by $d_{11}$.

In addition, the difference in distance between the second neighboring device 220 and each antenna is as shown in Equation 3 below.

$$\Delta d_2 = d_{21} - d_{20} \qquad \text{[Equation 3]}$$

The distance between the second neighboring device 220 and the first antenna 110-1 is denoted by $d_{20}$, and the distance between the second neighboring device 220 and the second antenna 110-2 is denoted by $d_{21}$.

Figure 5:
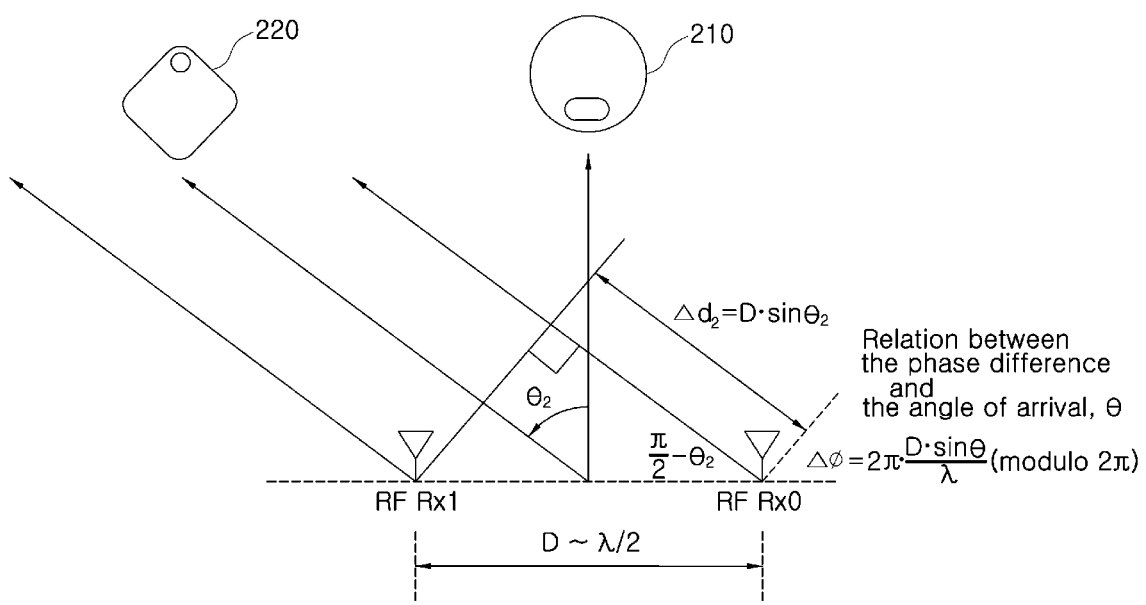
FIG. 5 shows a derived Equation between a measured signal phase difference and a signal reception angle.

FIG. 5 shows a relation between a signal phase difference and an angle of arrival of a signal. As shown in FIG. 5, the difference in distance $\Delta d_2$ between the second neighboring device 220 and each of the first antenna 110-1 and the second antenna 110-2 is expressed as D·sin $\theta_2$. Herein, D denotes the distance between the first antenna 110-1 and the second antenna 110-2, and $\theta_2$ denotes the angle of arrival at which a signal is received from the second neighboring device 220. The interval between the first antenna 110-1 and the second antenna 100-2 may be set to half of the wavelength according to a wireless communication standard.

Figure 6:
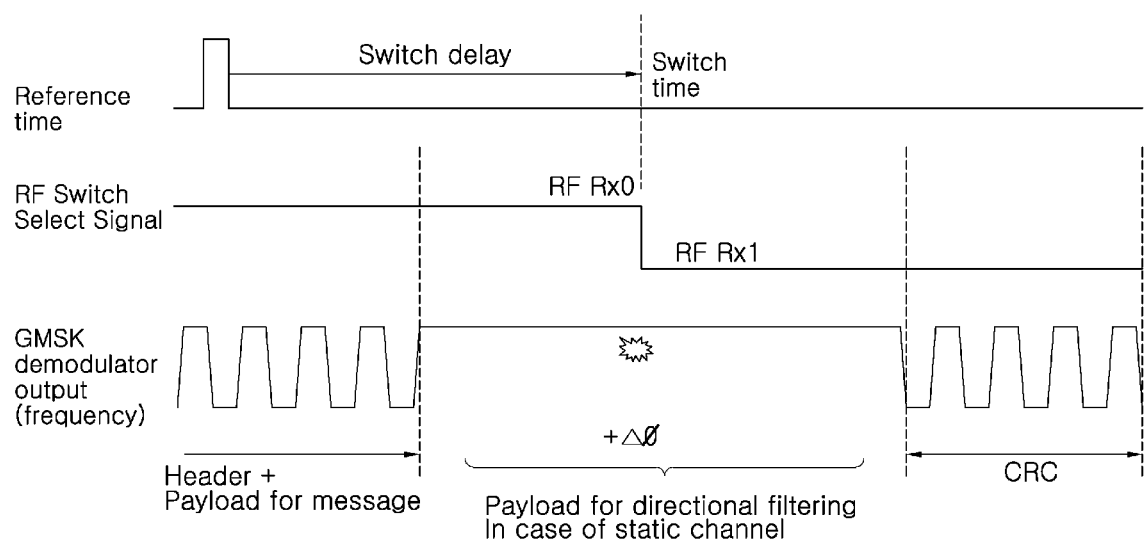
FIG. 6 shows a timing diagram of an antenna switch selection signal and a signal output from a demodulator according to an embodiment of the present disclosure.

FIG. 6 shows a timing diagram of an antenna switch control signal and a signal output from a demodulator according to an embodiment of the present disclosure.

In FIG. 6, the upper signal is an antenna switch control signal (antenna switch select signal) that is transmitted from the controller 130 to the antenna switch 115. The antenna switch control signal is a signal for determining which antenna's signal of the antenna array 110 is to be transmitted to the RF transceiver 120. In FIG. 6, the lower signal is a signal output from the demodulator, and may correspond to a signal transmitted from the RF transceiver 120 to the controller 130.

Referring to FIG. 6, a radio signal may include a header, a payload, a tone signal, and an error detection code (e.g., CRC code). Herein, the tone signal is a narrowband signal capable of signal phase detection in a signal section in which a transmission error is able to be detected with the error detection code. According to the present disclosure, a reception antenna may be switched in the time interval in which a tone signal is received. That is, the antenna switch controller 132 controls the antenna switch 115 to switch from the first antenna 110-1 to the second antenna 110-2 during a time interval in which a tone signal of a radio signal is received, and to receive the radio signal. For example, as shown in FIG. 6, a radio signal may be received through the first antenna 110-1 (RF Rx0), and in the middle of the section for a tone signal, a radio signal may be received through the second antenna 110-2 (RF Rx1).

When the reception antenna is switched, a phase difference between the radio signals received from the respective antennas occurs. The phase difference is measured to estimate the direction of the neighboring device 210 or 220. The present disclosure uses a method of detecting directions of neighboring devices 210 and 220 by demodulating two signals having different phase differences through antenna switching, and performing CRC error detection thereon.

Figure 7A:
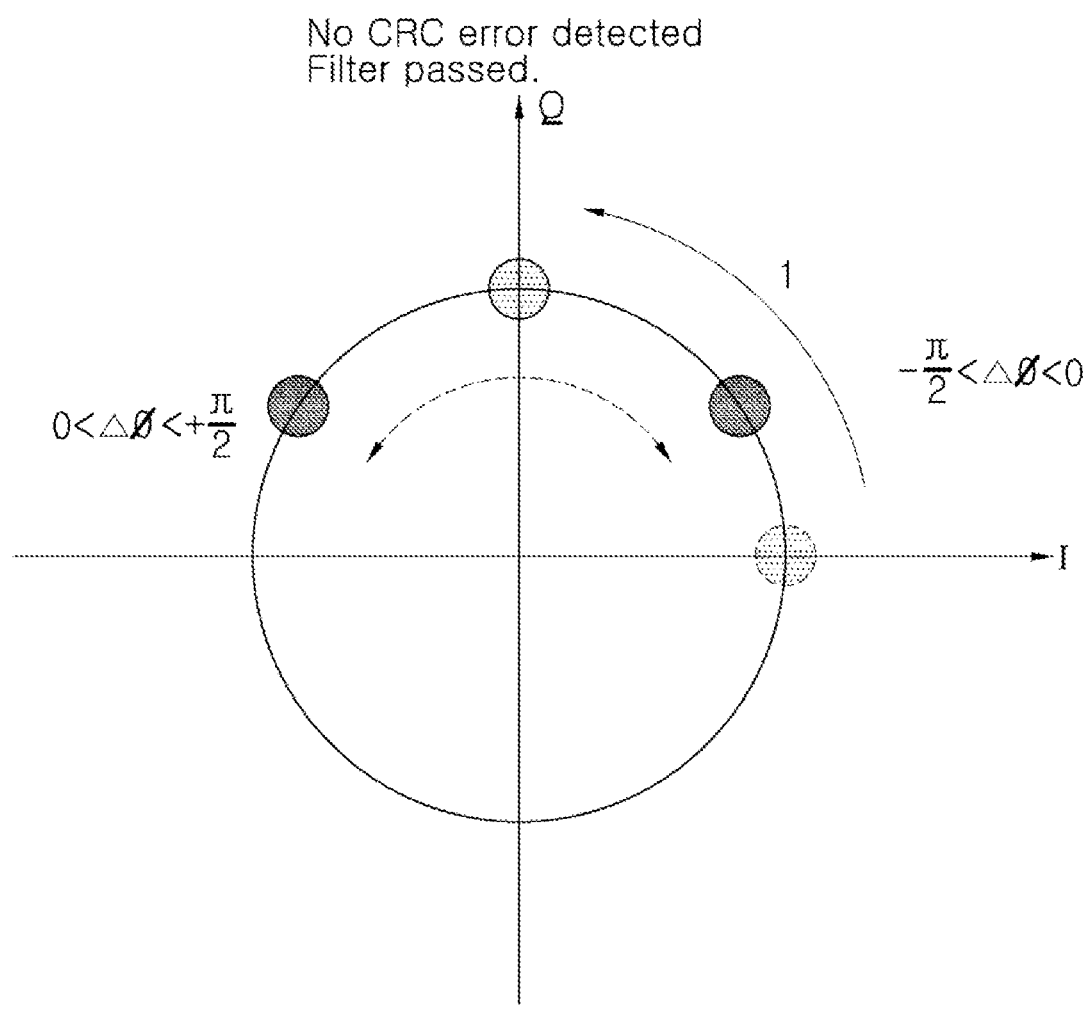
FIGS. 7A and 7B show a process of mapping a demodulation signal to a plane of a constellation diagram and reading a received bit for finding a direction according to an embodiment of the present disclosure.
Figure 7B:
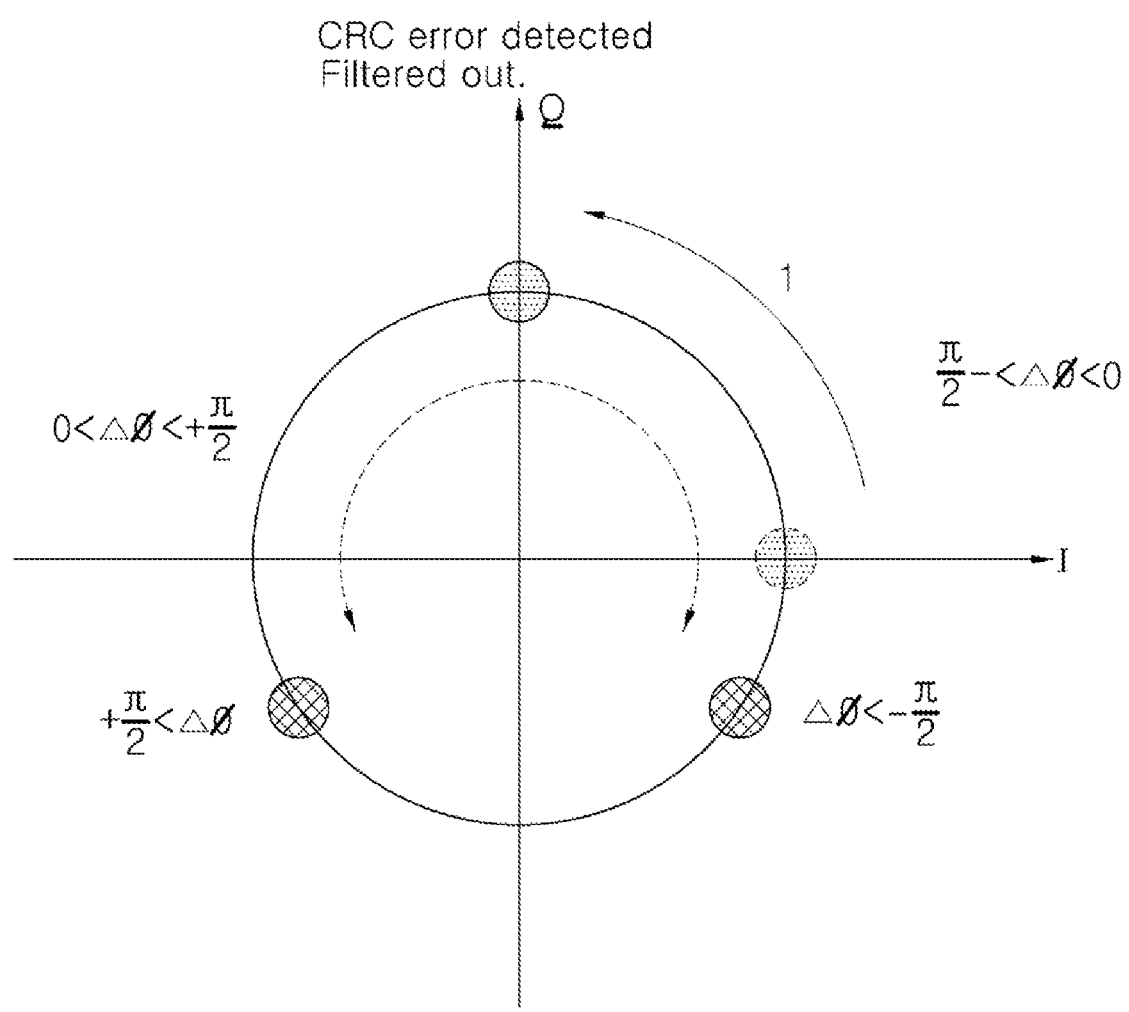

FIGS. 7A and 7B show a process of mapping a demodulation signal to a plane of a constellation diagram to detect a direction according to an embodiment of the present disclosure.

According to the present disclosure, the RF transceiver 120 may demodulate a tone signal received through the first antenna 110-1 to generate a first demodulation symbol, and may demodulate a tone signal received through the second antenna to generate a second demodulation symbol.

Referring to FIG. 7A, when the phase difference $\Delta\emptyset$ is in the range of $$-\frac{\pi}{2} < \Delta\emptyset < \frac{\pi}{2},$$

the first demodulation symbol and the second demodulation symbol are located in quadrants 1 and 2 of the plane of the constellation diagram. In this case, a CRC error is not detected. As in FIG. 7A, when the CRC error is not detected, it may be determined that a neighboring device is located in a range of an intended direction.

Referring to FIG. 7B, when the phase difference $\Delta\emptyset$ is in the range of $$+\frac{\pi}{2} < \Delta\emptyset \text{ or } \Delta\emptyset < -\frac{\pi}{2},$$

the first demodulation symbol and the second demodulation symbol are located in quadrants 3 and 4 of the plane of the constellation diagram. In this case, a CRC error is detected. As in FIG. 7B, when the CRC error is detected, it may be determined that a neighboring device is located outside the range of the intended direction.

According to the present disclosure, the controller 130 determines whether an IQ (in-phase/quadrature) component of the first demodulation symbol and an IQ component of the second demodulation symbol are located in an area (quadrants 1 and 2 of the plane of the constellation diagram) to which an IQ component of a tone signal belongs. When the IQ component of the first demodulation symbol and the IQ component of the second demodulation symbol are located in the area (quadrants 1 and 2 of the plane of the constellation diagram) to which the IQ component of the tone signal belongs in the plane of the constellation diagram, it may be determined that a neighboring device 210 or 220 is located in an area in a particular direction. When the IQ component of the first demodulation signal or the IQ component of the second demodulation signal is located in an area excluding the area to which the IQ component of the tone signal belongs in the plane of the constellation diagram, it may be determined that the neighboring device is located in an area excluding the area in the particular direction.

Through such an antenna switching and CRC error detection process, a direction of a neighboring device may be detected without additional hardware.

FIGS. 6, 7A, and 7B show a case in which the modulation index of the transmitter is set to 0.5 as an example, but an effective modulation index may be variably adjusted according to an embodiment. According to the present disclosure, a rotation angle of a demodulation signal at a switching point in time is changed to adjust the effective modulation index at the point in time variably, thereby adjusting a direction finding range of a neighboring device.

Figure 8:
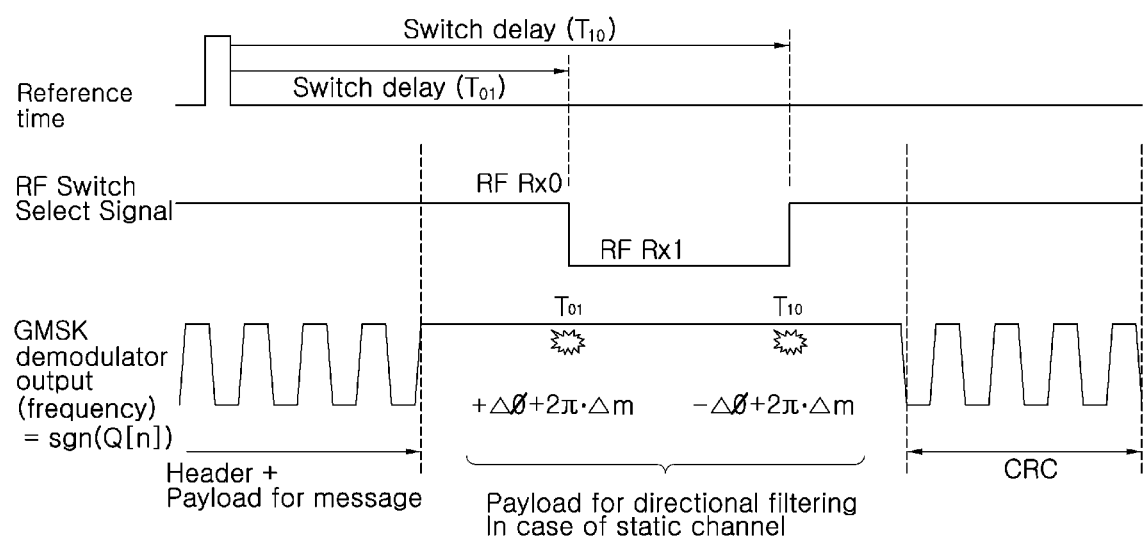
FIG. 8 shows a timing diagram of an antenna switch selection signal and a signal output from a demodulator according to an embodiment of the present disclosure.

FIG. 8 shows a timing diagram of an antenna switch selection signal and a signal output from a demodulator according to an embodiment of the present disclosure. Referring to FIG. 8, the antenna switch controller 132 switches the reception antenna from the first antenna 110-1 (RF Rx0) to the second antenna 110-2 (RF Rx1) at timing $T_{01}$ of a section in which a tone signal of a radio signal is received, and switches the reception antenna again from the second antenna 110-2 to the first antenna 110-1 at timing $T_{10}$ of the section for the tone signal. Herein, by additionally changing the angle of a rotator, the modulation index of the transmitter is adjusted by $\Delta m$, and a reference phase is changed accordingly.

A transmission error is not detected when signal distortion caused by a plurality of antenna switching operations is within an allowable range. Therefore, when a transmission error is not detected, the CRC decoder 134 determines that a neighboring device 210 or 220 that has transmitted the radio signal is located within a particular direction range.

Figure 9:
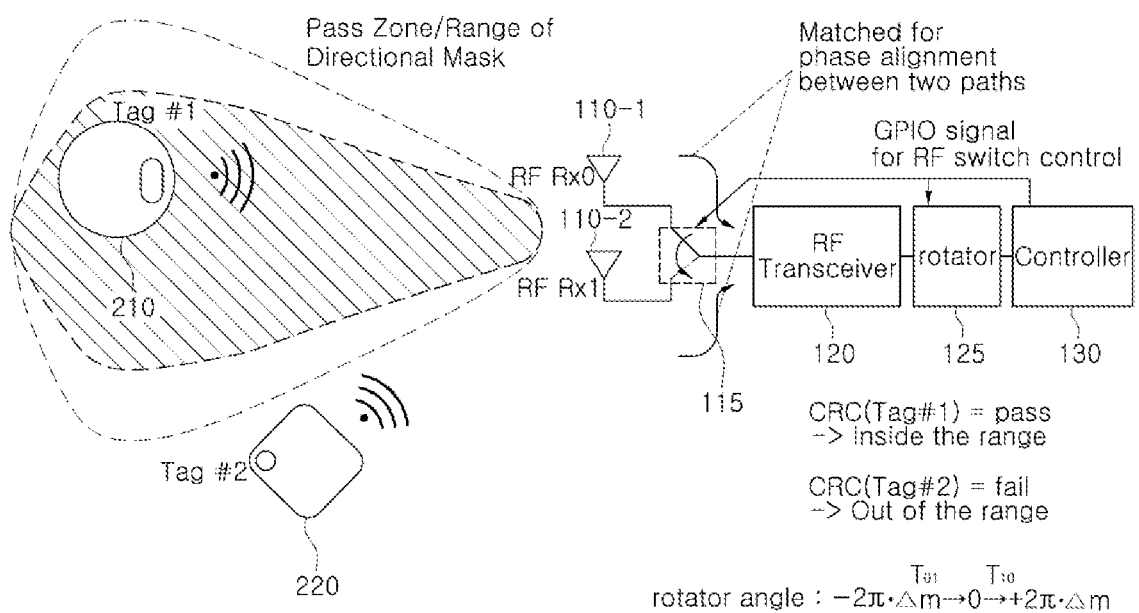
FIG. 9 shows a process of performing direction finding of a neighboring device by adjusting an effective modulation index at an antenna switching point in time according to an embodiment of the present disclosure.

FIG. 9 shows a process of performing direction finding of a neighboring device by adjusting an effective modulation index according to an embodiment of the present disclosure.

According to the embodiment of the present disclosure, the electronic device 100 may further include a rotator 125. The rotator 125 adds or subtracts a modulation index fixed by a neighboring device 210 or 220 at an antenna switching point in time, thereby adjusting an effective modulation index variably. According to an embodiment of the present disclosure, a direction finding area may be adjusted as shown in FIG. 9 by adjusting the effective modulation index corresponding to a plurality of antenna switching signals.

Figure 10A:
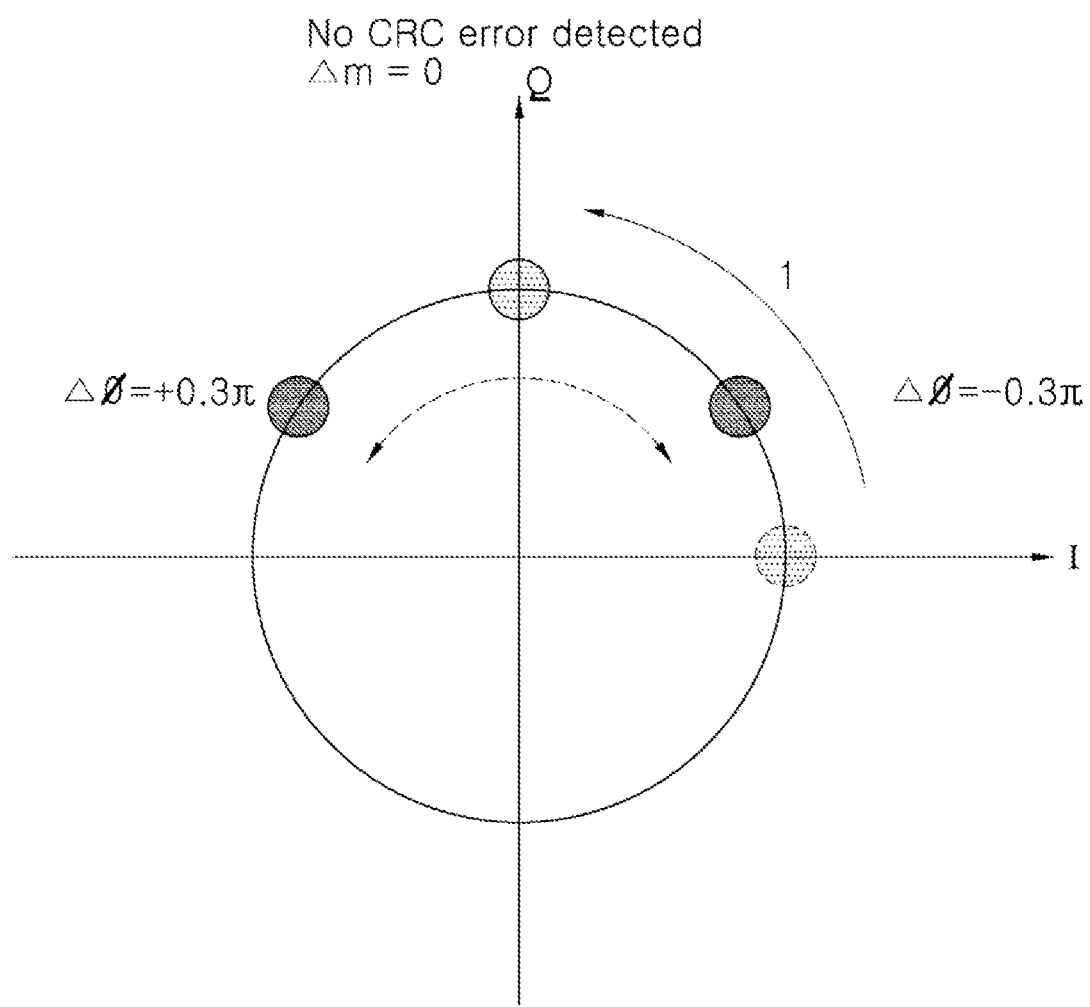
FIGS. 10A and 10B show a process of mapping a demodulation signal of which an effective modulation index is adjusted, to a plane of a constellation diagram to detect a direction according to an embodiment of the present disclosure.
Figure 10B:
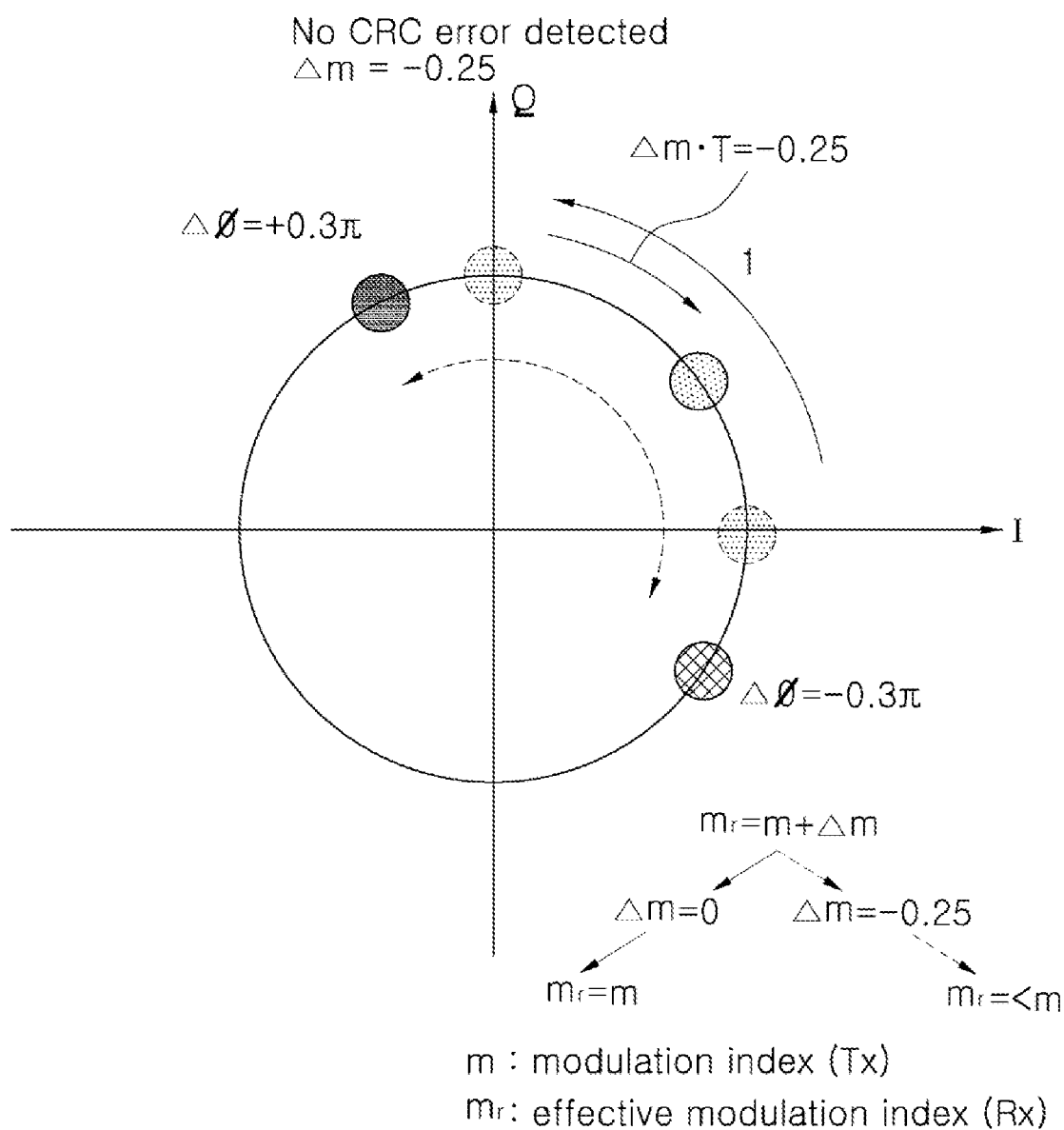

FIGS. 10A and 10B show a process of mapping a demodulation signal of which an effective modulation index is adjusted, to a plane of a constellation diagram to detect a direction according to an embodiment of the present disclosure. FIG. 10A shows the locations of modulated symbols in a plane of a constellation diagram when a reference modulation index of 0.5 is applied. FIG. 10B shows the locations of modulated symbols in a plane of a constellation diagram when an effective modulation index is adjusted by −0.25.

Referring to FIG. 10A, even though a certain amount of phase difference occurs due to the angles of arrival of the signals received from the respective antennas of the antenna array 110, all demodulation results are located in quadrants 1 and 2 in the plane of the constellation diagram, so a CRC error does not occur. However, when the effective modulation index is adjusted as shown in FIG. 10B is adjusted, the phase angle is changed and the locations of reference symbols (the first demodulation symbol and the second demodulation symbol) are thus biased. Accordingly, the phase difference caused by the angle of arrival of a signal is also changed. As a result, as shown in FIG. 10B, one of the modulated symbols is located in quadrant 4 in the plane of the constellation diagram, so a CRC error is detected. Consequently, the direction finding range may be reduced as shown in FIG. 9 by adjusting the effective modulation index in accordance with the change point in time by the antenna switch, and the direction of the neighboring device 210 or 220 may be detected more precisely.

FIG. 11 is a flowchart showing an example of a method of finding a direction of a neighboring device in a wireless communication system according to the present disclosure. The process shown in FIG. 11 may be performed by the electronic device 100 described above.

A method of finding a direction of a neighboring device in a wireless communication system according to the present disclosure may including the following: receiving a radio signal from a neighboring device 210 or 220 through the first antenna 110-1 in step S1110; switching from the first antenna 110-1 to the second antenna 110-2, and receiving the radio signal from the neighboring device 210 or 220 through the second antenna 110-2 in step S1120; switching again the reception antenna from the second antenna 110-2 to the first antenna 110-1 and receiving the radio signal through the first antenna 110-1; demodulating the radio signal and then performing decoding processing in step S1140; and detecting the direction in which the neighboring device 210 or 220 is located, by determining whether a demodulation signal is in a reference range through an error detection code in step S1150.

According to the present disclosure, the radio signal may include a header, a payload, and a tone signal.

According to the present disclosure, the step S1110 of receiving the radio signal from the neighboring device 210 or 220 through the second antenna 110-2 may include switching from the first antenna 110-1 to the second antenna 110-2 during a section in which a tone signal of the radio signal is received, and receiving the radio signal.

According to the present disclosure, the step S1130 of generating the demodulation signal may include: generating a first demodulation symbol by demodulating the tone signal received through the first antenna 110-1; and generating a second demodulation symbol by demodulating the tone signal received through the second antenna 110-2.

According to the present disclosure, the step S1140 of detecting the direction in which the neighboring device 210 or 220 is located may include: determining whether an IQ component of the first demodulation symbol and an IQ component of the second demodulation symbol are located in an area to which an IQ component of the tone signal belongs; determining the neighboring device 210 or 220 is located in an area in a particular direction when the IQ component of the first demodulation symbol and the IQ component of the second demodulation symbol are located in the area to which the IQ component of the tone signal belongs in a plane of a constellation diagram; or determining the neighboring device 210 or 220 is located in an area excluding the area in the particular direction when the IQ component of the first demodulation symbol or the IQ component of the second demodulation symbol is located in an area excluding the area to which the IQ component of the tone signal belongs in the plane of the constellation diagram.

According to the present disclosure, the method may further include adjusting an effective modulation index variably at a switching point in time.

According to the present disclosure, a detection range of the neighboring device 210 or 220 may be adjusted by adjusting the effective modulation index.

According to the present disclosure, the radio signal may be a signal modulated by GMSK.

Figure 12:
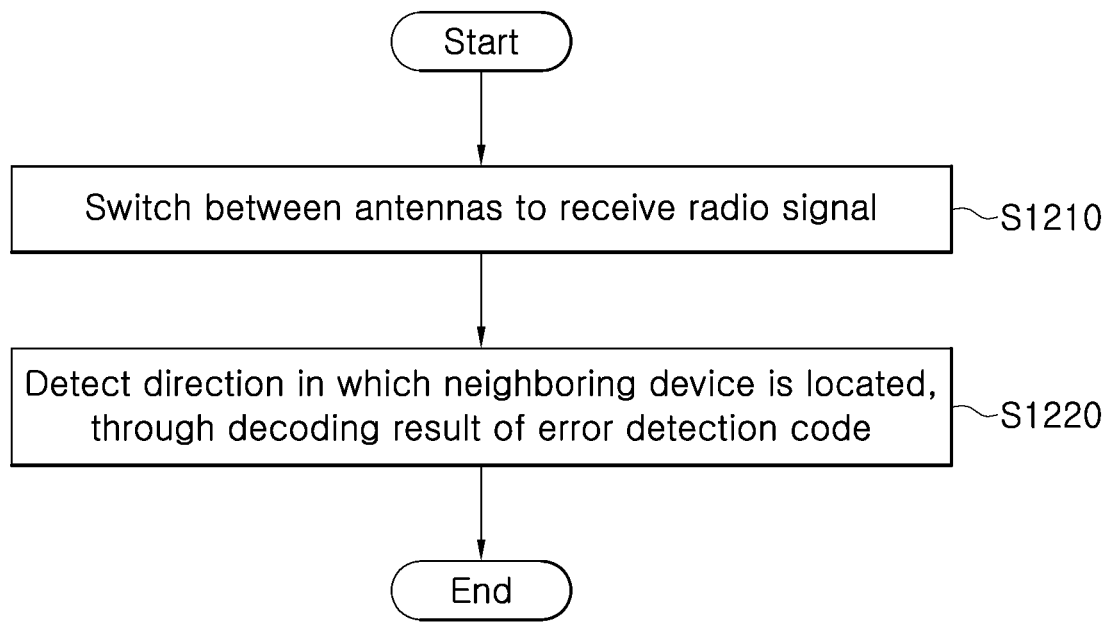

FIG. 12 shows an operation method of an electronic device 100 for finding a direction of a neighboring device 210 or 220 in a wireless communication system according to the present disclosure, the electronic device including a plurality of antennas (antenna array 110). The steps of FIG. 12 may be performed by the antenna switch controller 132 with the timing signal from the reference timing generator 133 and the CRC decoder 134 of the controller 130.

The operation method of the electronic device 100 according to the present disclosure includes: performing control in step S1210 to receive a radio signal from the neighboring device through the first antenna 110-1, and to switch from the first antenna 110-1 to the second antenna 110-2 in a signal section in which an error detection code is able to be detected, and to receive the radio signal from the neighboring device 210 or 220 through the second antenna 110-2; and detecting the direction in which the neighboring device 210 or 220 is located in step S1220, by determining whether a demodulation signal is in a reference range from a result of reading the error detection code.

According to an embodiment of the present disclosure, the radio signal may include a tone signal that is a narrowband signal capable of signal phase detection in the signal section in which a transmission error is able to be detected with the error detection code.

According to an embodiment of the present disclosure, the performing of control to receive the radio signal in step S1210 may include performing control to switch from the first antenna 110-1 to the second antenna 110-2 and switch again from the second antenna 110-2 to the first antenna 110-1 during a section in which the tone signal of the radio signal is received, and to receive the radio signal.

According to an embodiment of the present disclosure, the transmission error is not detected when signal distortion caused by a plurality of antenna switching operations is within an allowable range. The detecting of the direction in which the neighboring device is located in step S1220 may include determining that the neighboring device 210 or 220 that has transmitted the radio signal is located in a particular direction range when the transmission error is not detected.

According to an embodiment of the present disclosure, the operation method may further include performing rotation to adjust an effective modulation index variably.

According to an embodiment of the present disclosure, a detection range of the neighboring device 210 or 220 may be adjusted by adjusting the effective modulation index corresponding to a plurality of antenna switching signals.

The embodiments and the accompanying drawings in this specification only clearly show a part of the technical idea included in the present disclosure, and thus it will be apparent that all modifications and specific embodiments that can be easily inferred by those skilled in the art within the scope of the technical idea included in the specification and drawings of the present disclosure are included in the scope of the present disclosure.

Therefore, the spirit of the present disclosure shall not be limited to the above-described embodiments, and the entire scope of the appended claims and their equivalents will fall within the scope and spirit of the disclosure.

What is claimed is:

1. An electronic device for finding a direction of a neighboring device in a wireless communication system, the electronic device comprising:
    an antenna array including a first antenna and a second antenna for receiving a radio frequency (RF) signal;
    an antenna switch configured to switch from the first antenna to the second antenna; and
    a controller configured to:
    control the antenna switch to receive the RF signal from the neighboring device through the first antenna;
    control the antenna switch to switch from the first antenna to the second antenna to receive the RF signal during a time interval in which an error detection code is detected; and
    detect the direction in which the neighboring device is located based on a result of decoding the error detection code.

2. The electronic device of claim 1,
    wherein the RF signal includes a tone signal which is a narrowband signal in which a transmission error is detected using the error detection code.

3. The electronic device of claim 2,
    wherein the controller is configured to switch from the first antenna to the second antenna and switch again from the second antenna to the first antenna during a time interval in which the tone signal of the RF signal is received.

4. The electronic device of claim 3, wherein the transmission error is not detected when signal distortion caused by a plurality of antenna switching operations is within an allowable range, and when the transmission error is not detected, the controller determines that the neighboring device that has transmitted the RF signal is located in a particular direction range.

5. The electronic device of claim 4, further comprising:
    a rotator configured to adjust an effective modulation index by adding or subtracting a modulation index fixed by a transmitter of the neighboring device when switching from the first antenna to the second antenna.

6. The electronic device of claim 5, wherein a detection range of the neighboring device is adjusted by adjusting the effective modulation index corresponding to a plurality of antenna switching signals.

7. An operation method of an electronic device for finding a direction of a neighboring device in a wireless communication system, the electronic device including a plurality of antennas and the method comprising:
    receiving a radio frequency (RF) signal from the neighboring device through a first antenna of the plurality of the antennas;
    switching from the first antenna to a second antenna of the plurality of the antennas to receive the RF signal from the neighboring device through the second antenna during a time interval in which an error detection code is detected; and
    detecting the direction in which the neighboring device is located in a certain range based on a result of decoding the error detection code.

8. The operation method of claim 7,
    wherein the RF signal includes a tone signal which is a narrowband signal in which a transmission error is detected using the error detection code.

9. The operation method of claim 8, further comprising:
    switching from the first antenna to the second antenna and switching again from the second antenna to the first antenna during a time interval in which the tone signal of the RF signal is received.

10. The operation method of claim 9,
    wherein the transmission error is not detected when signal distortion caused by a plurality of antenna switching operations is within an allowable range, and
    the detecting of the direction in which the neighboring device is located comprises determining that the neighboring device that has transmitted the RF signal is located in a particular direction range when the transmission error is not detected.

11. The operation method of claim 10, further comprising:
    adjusting an effective modulation index by adding or subtracting a modulation index fixed by a transmitter of the neighboring device when switching from the first antenna to the second antenna or switching the second antenna to the first antenna.

12. The operation method of claim 11, wherein a detection range of the neighboring device is adjusted by adjusting the effective modulation index corresponding to a plurality of antenna switching signals.

* * * * *